Feb. 18, 1936.                    J. G. VINCENT                    2,031,395
                          INTERNAL COMBUSTION ENGINE
                            Filed April 17, 1931             2 Sheets-Sheet 1
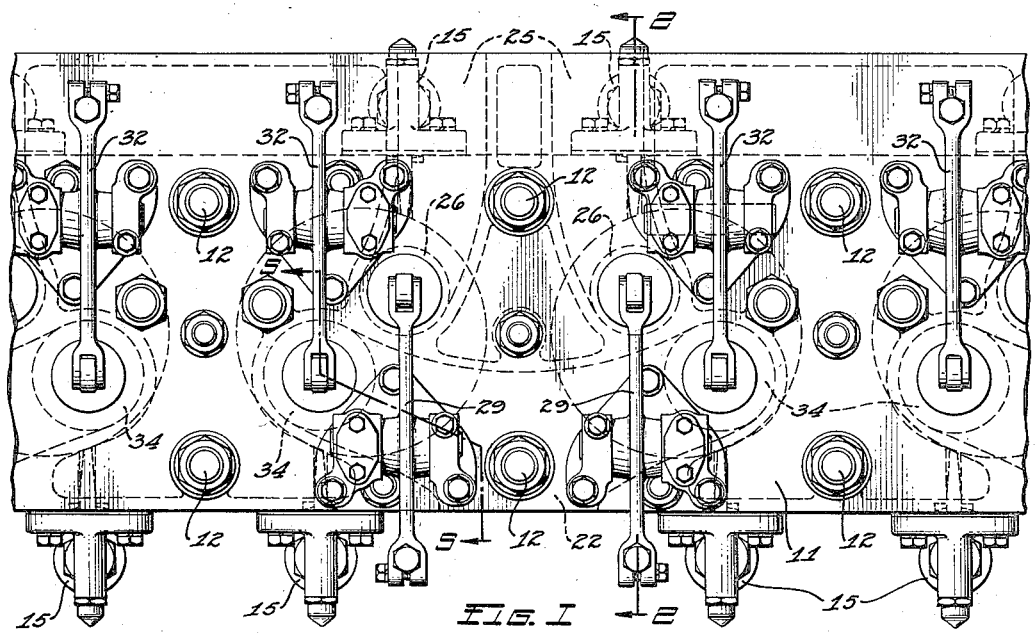
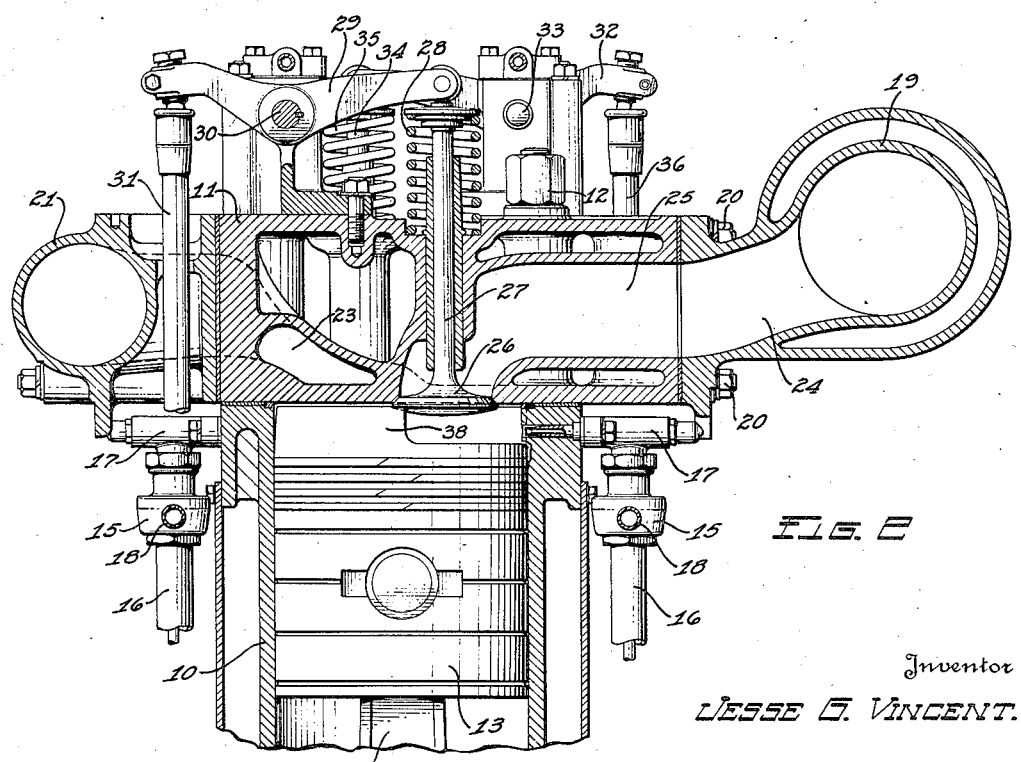
Inventor
JESSE G. VINCENT.

Feb. 18, 1936.     J. G. VINCENT     2,031,395
INTERNAL COMBUSTION ENGINE
Filed April 17, 1931     2 Sheets-Sheet 2
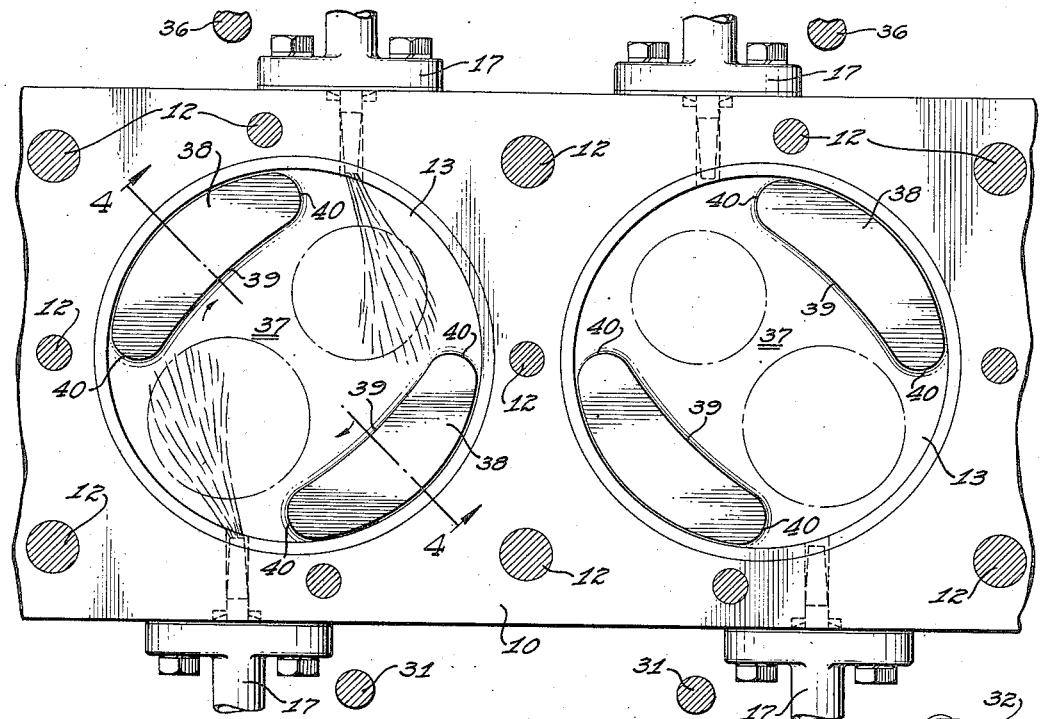
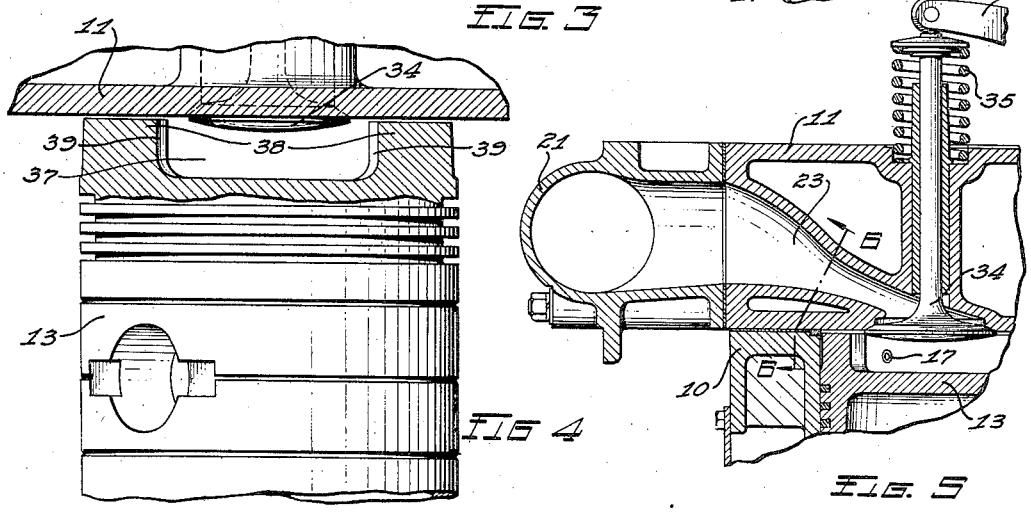
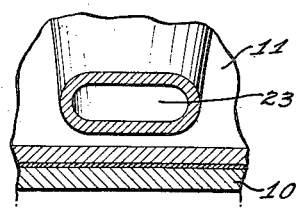
Inventor
JESSE G. VINCENT.

Patented Feb. 18, 1936

2,031,395

UNITED STATES PATENT OFFICE 2,031,395

INTERNAL COMBUSTION ENGINE

Jesse G. Vincent, Detroit, Mich., assignor to Packard Motor Car Company, Detroit, Mich., a corporation of Michigan Application April 17, 1931, Serial No. 530,916

21 Claims. (Cl. 123—32)

This invention relates to internal combustion engines and more particularly to engines of the compression-ignition type and the method of operating the same.

One manner of operating engines of the compression-ignition type is to introduce air and liquid fuel separately into the cylinder combustion spaces, in a manner and condition such that they will intermingle to form a combustible mixture which will ignite by compression.

With this form of engine it is customary to rotate and compress the air charges in the cylinders and then inject atomized liquid fuel charges into the rotating compressed air charges so that the fuel will be uniformly distributed therein. Penetration of the air by the fuel, however, is limited by the fineness of its atomization, and consequently properly atomized liquid fuel can be projected only a limited distance. In some instances, two or more fuel injection devices are utilized. However, while more fuel is injected into the rotating air by such plurality of devices, the penetration thereof is no greater than would be had with a single device and in either case the central portions of the rotating air charges, in engines having combustion spaces of large diameter, are not utilized and efficiency is thereby lessened.

In many instances, the use of two fuel injection devices is necessary to introduce the desired quantity of fuel into the air charges so that they will be properly intermingled in the short space of time allowed in a high speed engine, and with an in-line engine it is customary to arrange the injection devices on opposite sides of the cylinder block. Difficulties have arisen in trying to locate these injection devices on such engines because of the interference with the valves and vave operating mechanism.

It is an object of the present invention to provide a novel form of fuel injection internal combustion engine, in which the above mentioned undesirable conditions are eliminated.

Another object of the invention is to provide a Diesel engine in which the walls of the combustion chamber are formed in a manner to induce turbulence of a nature such that the compressed air charges will intermingle with fuel injected from a plurality of injection devices to produce efficient and economical operation even though the fuel penetration is less than the radius of the cylinder or combustion space.

Another object of the invention resides in the provision of a combustion chamber for Diesel engines in which the end walls are formed so that a confined combustion space extends entirely across the largest cylinder diameter.

A further object of the invention resides in the arrangement of the fuel injection devices and the valve operating mechanism, in their relation with pairs of adjacent cylinders, so that the injection devices can be readily attached and removed from the cylinders without interference.

Another object of the invention resides in the provision of a novel form of plural injection compression ignition engine in which the combustion spaces are formed to induce compressed air charges within the cylinders to rotate in a confined space adjacent the outlets of injection devices when the pistons approach top center compression position.

Another object of the invention is to provide a Diesel engine in which the air and fuel charges are introduced into the cylinders and moved in directions such that a thorough and rapid intermingling results.

Another object of the invention resides in the method of operating a compression-ignition type of internal combustion engine so that liquid fuel and air will be introduced separately into combustion spaces in the cylinders and intermingled in a manner to produce efficient and economical operation.

Other objects of the invention will appear from the following description taken in connection with the drawings, which form a part of this specification, and in which:

Fig. 1 is a top plan view of a portion of an engine incorporating my invention, with the inlet and exhaust manifolds removed;

Fig. 2 is a vertical sectional view of the upper portion of the engine taken on line 2—2 of Fig. 1;

Fig. 3 is a horizontal sectional view of the engine with the head removed, the relation of the valves therewith being shown in dot and dash lines;

Fig. 4 is an elevational view of one of the pistons and the adjacent head wall with the upper portion of the piston and the head wall in section, as taken on line 4—4 of Fig. 3;

Fig. 5 is a fragmentary sectional view taken on line 5—5 of Fig. 1, illustrating one of the air inlet ports and the control mechanism therefor;

Fig. 6 is a sectional view taken on line 6—6 of Fig. 5.

Referring now to the drawings by characters of reference, 10 indicates the cylinder block of a Diesel type engine in which the cylinders are arranged in-line, and 11 indicates the head block which is secured upon the top of the cylinder block by a plurality of securing devices 12, such as studs or bolts. Pistons 13 are arranged to reciprocate within the cylinders and conventional rods 14 connect the pistons with the crank shaft (not shown) in the usual manner.

The cylinders are preferably spaced so that they are arranged in pairs and two liquid fuel injection devices 15 are shown associated with each cylinder, one on each side thereof and offset relatively. Each of such injection devices preferably includes a pump section 16, and a nozzle section 17 which is bolted directly to the cylinder wall and projects through the wall so that the fuel can be projected directly into the cylinder preferably normal to a plane through the axes of the several cylinders and preferably in the form of a hollow cone spray which is deflected into the form shown in Fig. 3 by compressed rotating air in the combustion chamber. Any form of injection device can be employed so long as the liquid fuel is projected directly into the compressed air charges interiorly of the cylinder. Suitable conduits 18 conduct liquid fuel to the pumps under low pressure, from a source of supply (not shown).

Extending lengthwise of one side of the cylinder block is an exhaust manifold 19 which is secured thereto by suitable bolts 20, and arranged to extend longitudinally along the opposite side of the cylinder head block is an air inlet manifold 21 which is secured thereto by suitable fastening means. The cylinder head is formed with chambers 22 which communicate with the air inlet manifold 21, and each such chamber communicates with the inlet ports 23 of a pair of cylinders. Each such intake port is shown in the form of a flattened venturi extending tangentially with respect to the inner wall of the cylinder with which it communicates and at an angle to the axis thereof so that air drawn through the ports will be caused to rotate within the cylinders. Such rotation of the air charges continues during the compression periods. It will be understood that the engine illustrated is of the four cycle type, though my invention could be associated equally well with engines of other cycles.

The exhaust manifold 19 is provided with passages 24 which communicate with individual exhaust ports 25 leading through the head block to the interior of the several cylinders. It will be observed that the air inlet ports of each pair of cylinders are arranged on one side of the engine, whereas the exhaust ports of each pair of cylinders are arranged on the opposite side of the engine. The injection devices associated with each pair of cylinders on the exhaust side are closer together than are the injection devices for such cylinders on the air inlet side, and through this arrangement of the injection devices and the inlet and the outlet ports for each pair of cylinders, I am able to associate the valve operating mechanism with the engine so that the injection devices can be attached and removed without interference, thus facilitating both manufacture and service.

A poppet type of valve 26 is arranged to control the inner end of each exhaust port 25, and the stems 27 thereof extend upwardly through bushings in the cylinder head block. A coil spring 28 is associated with each valve stem to normally hold the valve seated. A rock lever 29, pivoted upon the shaft 30 and extending beyond the cylinder head on the air manifold side, is associated with each exhaust valve to hold it open when actuated through push rod mechanism indicated at 31, such mechanism being operated from a cam shaft (not shown) extending along the side of the engine farthest from the valves actuated thereby. The rock levers 29 are arranged in parallel relation and intermediate the fuel injection devices of each pair of cylinders on the air manifold side of the engine, each rock lever being disposed substantially in alignment with the nozzle of an injection device on the opposite side of the cylinder. The valve relation in each pair of cylinders permits locating the valve operating mechanisms so that the position of the push rods will not interfere in any way with the removal and assembly of the fuel injection devices such as would be the case if the valves and their operating mechanisms were similarly arranged in opposite relationship with respect to each cylinder.

Rock levers 32 are pivoted upon shafts 33 and cooperate with the stems of poppet valves 34 to hold the same open during the suction stroke of the pistons, each such rock lever being preferably disposed in alignment with the nozzle of the fuel injection device on the opposite side of its cylinder. Such poppet valves control the inner ends of the air inlet ports 23 leading into the cylinders and are normally closed by coil springs 35. Suitable push rod mechanisms 36 for actuating the rock levers 32 extend vertically along the side of the engine on which the exhaust manifold is located, and are arranged to be actuated from a cam shaft (not shown) on the side of the engine farthest from the valves actuated thereby. The rock levers 32 of each pair of cylinders are spaced, due to the air inlet port arrangement, and the two fuel injection devices 15, on the air manifold side of the engine, can be arranged between the levers in each pair. Consequently, such injection devices can be attached and removed without interference of the inlet valve actuating mechanism.

The close spacing of the outlet valves of a pair of cylinders and the greater spaced relation of the inlet valves thereof results in a diagonal arrangement of the valves of each cylinder, a line through the valves of one cylinder of the pair being substantially normal to a line through the valves of the other cylinder thereof.

The air inlet manifold is provided with apertures through which the exhaust valve push rods extend and the head block is provided with apertures through which the inlet valve push rods extend. The valves and their operating mechanisms are of conventional type but they are arranged and related in a novel manner, as hereinbefore described.

In order to provide efficient turbulence within the cylinders as well as a high compression ratio, I form one of the end walls of each combustion chamber so that the fuel charges will be given definite directions of movement at the time of and after the fuel is injected therein. Either the cylinder head or the piston forming the ends of the combustion chamber can assume the form to induce such turbulence and permit such compression ratio, but I preferably form the head end of the piston in a novel manner for this purpose.

Each of the pistons is provided with an elongated recess or pocket 37 which extends thereacross, such recess being shown widest at its center and ends. Through forming the recess in the piston end, a pair of substantially parallel bosses 38 project from the end of the piston, and the inner adjacent walls 39 of such bosses are curved outwardly and in opposite directions relative to each other. The ends 40 of such bosses are also curved in a plane transversely of the piston and the space between the curved walls 39 of the piston is of sufficient width to receive the heads of the inlet and the outlet valves which in opening project inwardly of the cylinder. The pistons are arranged in the cylinders so that the crosswise extending recess in each cylinder will extend diagonally, and substantially normal relatively to that of the adjacent cylinder. This arrangement of the piston recesses in each pair of cylinders permits the association of the valves and their actuating mechanism and the injection devices with the cylinders in the heretofore described relation, and also influences the air charges in the cylinder to cause movement thereof in a definite relation with the dual injection devices so that there will be a novel form of turbulence causing the fuel charges to be properly intermingled with the air charges in a short space of time. As the recesses are symmetrical and extend entirely across the full diameter of the pistons, they with the adjacent flat wall of the head block will provide combustion spaces in which the explosion forces will react uniformly entirely across the pistons and will consequently eliminate side thrust usually caused when the combustion spaces are otherwise disposed relative to the piston axes.

With this form and arrangement of pistons, the boss portions 38 can closely approach the cylinder head when the pistons are at top center position because the recesses are of sufficient depth to receive the heads of the valves, and thus a high compression ratio is provided and without any valve interference even though they should stick in their open position. Each combustion space is bounded by a portion of the cylinder wall, the interior walls of the bosses 38, the piston head forming the bottom of the recess 37 and the wall of the head block immediately above the recess.

As previously pointed out, the two injection devices for each cylinder are parallel, and they are arranged so that they are adjacent the end of one of the piston bosses past which the air first moves in its rotation in the cylinder. With this arrangement of the fuel injection devices, atomized liquid fuel is sprayed diagonally across the end portions of the recesses and will have time enough to mix with the compressed air rotating in the recesses before reaching the opposite piston boss, and as a result the intermingling is efficiently provided for and with practically no carbon deposit on the pistons.

Air is drawn through an intake port 23 into a cylinder during the suction stroke of the piston therein, and is caused to be rotated due to the form and arrangement of the port. During the compression stroke such air continues to rotate in the cylinder as a mass with the lower strata thereof confined in the piston recess 37. As the piston moves toward the head, the rotating air becomes more confined in the piston recess where its rotation continues until the piston closely approaches the head when air rotating between the end of the bosses and the head will be squeezed over the edges of the walls 39 into the recess. The air squeezed into the air rotating in the recess will tend to move axially of the cylinder and will disrupt the rotation of the air in the recess and cause a violent turbulence therein.

The liquid fuel injection is arranged to occur near the completion of the compression stroke so that the liquid charges are projected into the air rotating in the piston recess and ignition of the mixture will have started just prior to the squeezing of the charge over the edges of the bosses. As a result the flame spread will be very thorough and rapid during the turbulence as the compression stroke is completed. Combustion of the fuel mixture imparts forces uniformly across the diameter of the piston and moves it downwardly on the power stroke following which the exhaust valve is opened and the piston moves toward the head again to force out the exhaust gases.

It will be seen that through the arrangement of the combustion spaces and the association of the valves therewith, a turbulence and compression ratio are provided which will result in a highly efficient and economical engine operation, and which will also permit dual injection devices to be readily removed and attached to the cylinders without interference on the part of the valve push rods.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an in-line internal combustion engine, a cylinder having a combustion chamber therein, a piston in the cylinder having its head end forming one end of the combustion chamber, said piston head end having a recess extending thereacross in a diagonal direction to the sides of the engine, and a cylinder head forming the other end of the combustion chamber.

2. In an internal combustion engine, a cylinder having a combustion chamber therein, a piston in the cylinder forming one end wall of the combustion chamber, and a cylinder head forming the other end wall of the combustion chamber, said piston end wall having a recess extending thereacross and with the wall portions forming the sides of the recess curving diametrically in opposite directions.

3. In an internal combustion engine, a cylinder having a combustion chamber therein, a piston in the cylinder forming one end wall of the combustion chamber, and a cylinder head forming the other end wall of the combustion chamber, said piston end wall having a recess extending diametrically thereof and with the wall portions defining the sides of the recess curved diametrically throughout their length.

4. In a fuel injection engine, a cylinder, a piston in the cylinder having a diametric recess of substantially uniform depth in the head, the side walls forming the recess being curved diametrically and diverging toward the ends and center, and a cylinder head having a substantially flat inner surface.

5. In an in-line engine, a cylinder forming the combustion chamber in which air is compressed, a reciprocating piston in the cylinder forming an end wall of the combustion chamber, a cylinder head forming another end wall of the combustion chamber, the end wall of said piston having a recess extending diametrically thereacross and diagonally of the sides of the engine, and fuel injection devices extending through opposite sides of the cylinder, said devices being arranged to inject fuel into the cylinder in a direction traversing the respective adjacent end portions of the recess.

6. In an in-line engine, a cylinder forming the combustion chamber in which rotating air charges are compressed, a reciprocating piston in the cylinder forming an end wall of the combustion chamber, a cylinder head forming another end wall of the combustion chamber, the end wall of said piston having a recess extending diametrically thereacross and diagonally of the sides of the engine, and injection devices extending through opposite sides of the cylinder, said devices being located to inject fuel across the ends of the recess and adjacent the side of the recess first traversed by the rotating air charges in the cylinder.

7. In an in-line engine, a cylinder forming the combustion chamber in which air charges are introduced and rotated, a reciprocating piston in the cylinder having a recess across the head end, a cylinder head, and parallel fuel injection devices arranged on opposite wall portions of the cylinder for injecting charges in opposite directions into the combustion chamber, said piston being arranged in the cylinder with the recess diagonal to the sides of the engine and with the ends of the recess in registration with the injection devices.

8. In an engine, a pair of cylinders arranged side by side, cylinder heads, pistons in the cylinders having diametric recesses extending across their head ends, said pistons being arranged with their recesses extending diagonally and normal to each other, means for conducting air charges into and causing rotation thereof in the two cylinders, and devices for injecting fuel into opposite sides of the cylinders and adjacent the near side of the end portion of the recesses relative to the direction of air rotation.

9. In an engine, a cylinder block having the cylinders arranged in pairs, a cylinder head block, pistons in the cylinders having a diagonally extending recess across the head ends, the recesses in the pistons in the cylinders of each pair being arranged normal to each other, a pair of injection devices extending through opposite walls of the cylinder block and spaced to project fuel charges into each of the cylinders in directions traversing the ends of the piston recesses, said head block having inlet and outlet passages disposed to enter the cylinders normal to the ends of the recesses in the pistons, and inwardly opening valve means associated with the head block, said piston recesses being of a width and depth to receive the valve heads when the pistons are at top center.

10. In a Diesel engine, a pair of cylinders, pistons in the cylinders having a diagonally disposed recess across the end wall of each piston head and extending normally relatively to each other, cylinder heads, a pair of injection devices fixed to and extending through opposite walls of each cylinder, the devices on one side of the cylinders being spaced relatively more than those on the other side of the cylinders, said cylinder heads having inlet and outlet ports opening into the cylinders normal to the ends of the piston recesses, valves controlling the ports, mechanisms arranged intermediate the wider spaced injection devices on a similar side of the cylinders for actuating the valves nearest the other side of the cylinders, and mechanisms beyond the more closely spaced injection devices on the other side of the cylinders for actuating the valves nearest the opposite side of the cylinders, the arrangement of said valve actuating mechanisms allowing attachment and removal of the injection devices without interference.

11. In an engine of the injection type, a pair of cylinders, a head structure for the cylinders, pistons in the cylinders each having a diagonally extending diametric recess across the head end thereof, said recesses extending in angular directions relative to each other, said head having air inlet ports leading into the same sides of the cylinders and outlet ports leading into the other side of the cylinders, said ports leading into the cylinders normal to the ends of the recesses in the pistons, poppet valves for the ports extending through the head structure, fuel injection devices extending through the opposite sides of each cylinder, the devices on one side being closer together than those on the other side and arranged to project fuel into the cylinders in a direction traversing the ends of the recesses in the pistons, a pair of mechanisms intermediate the wider spaced injection devices for actuating the outlet valves, and a pair of mechanisms on the remote sides of the closer spaced injection devices for actuating the inlet valves, said pairs of valve operating mechanisms being along opposite sides of the cylinders and extending to the valves most removed across the head structure.

12. In an in-line engine, a cylinder block having the cylinders arranged in pairs, a cylinder head block, pistons in the cylinders having a diagonally extending recess across the head ends, the recesses in the pistons in the cylinders of each pair being arranged normal to each other, and injection devices extending through opposite walls of the cylinder block and arranged to project fuel charges into the cylinders in directions traversing the ends of the piston recesses.

13. In an internal combustion engine, in-line cylinders each including a head having an inlet and an outlet port therethrough, valves for controlling the ports extending through the heads in spaced relation longitudinally of the engine, an injection device associated with each side of each cylinder, an overhead rock lever for actuating each valve, said rock levers projecting beyond the associated cylinder on the remote side of the engine from the controlled passage and in alignment with the injection device on the other side of the engine, and push rod means on opposite sides of the engine for operating each rock lever.

14. In an internal combustion engine, in-line cylinders each including a head having an inlet and an outlet port therethrough, said ports being spaced longitudinally of the engine, valves for controlling the ports extending through the head, an overhead rock lever for each valve, said levers being parallel and spaced longitudinally of the engine and projecting beyond the side of the engine remote from the associated valves, push rod means at the sides of the cylinders for operating said rock levers, and a fuel injection device extending into the sides of the cylinders adjacent each of the push rods, a pair of said devices communicating with the interior of each cylinder and on opposite sides thereof.

15. In an internal combustion engine, a pair of in-line cylinders including a head, a piston in each cylinder having a diametrically extending recess in the head end thereof, said pistons being arranged with the recesses diagonally of the engine and normal to each other, inlet passages extending through the head to the interior portions of the cylinders above the ends of the recesses spaced furthest apart, outlet passages through the head communicating with portions of the interior of the cylinder above the ends of the recesses closest together, a valve for controlling each of the passages, said valves extending through the head, an overhead rock lever for each valve, said levers projecting beyond the sides of the engine remote from the valves with which they are associated, push rod means along the sides of the cylinders for operating the rock levers, and devices extending into the side of each cylinder for injecting fuel across each end of the recessed portion of the pistons.

16. In an internal combustion engine, a pair of in-line cylinders, a cylinder head having an air inlet manifold therein leading to the cylinders on the same side of the engine and exhaust outlets therein leading from the cylinders on the other side of the engine, said inlet manifold communicating with the interior of the cylinders to induce rotation of the air in the cylinders in opposite directions relatively, and fuel injection devices arranged to discharge into each cylinder from each side of the engine.

17. In an internal combustion engine, a pair of in-line cylinders, a piston in each cylinder having a diametrically extending recess in the head end thereof, said pistons being arranged with the recesses diagonally of the engine and normal to each other, a cylinder head having an air inlet manifold in one side thereof communicating with the interior of the cylinders above the end of the recesses spaced furthest apart, outlet passages in the cylinder head communicating with the cylinders above the ends of the piston recesses nearest together, said inlet manifold directing air into the interior of the cylinders in opposite directions relatively, and fuel injection devices arranged to discharge into each cylinder in a relation coinciding with the end portions of the piston recesses.

18. In an internal combustion engine, a cylinder having a combustion chamber therein, a piston in the cylinder, the head end of said piston forming one wall of the combustion chamber and having a diametrically extending recess formed in the end thereof, the opposite walls defining the recess being spaced the greatest distance at the periphery of the piston and being appreciably closer at points intermediate the piston periphery, and a cylinder head having a flat wall forming the other wall of the combustion chamber.

19. In an internal combustion engine of the compression ignition type, the combination with an elongated combustion chamber into which an air charge is compressed, means for establishing rotation of the air charge about a short axis of the chamber, and means for injecting atomized liquid fuel charges into the compressed rotating air charge in two parallel jets from opposite sides of the chamber and in directions opposite to each other and in the direction of rotation.

20. In an internal combustion engine of the compression ignition type, the combination with an elongated combustion chamber into which an air charge is compressed, means for establishing rotation of the air charge about a short axis of the chamber, and means for injecting atomized liquid fuel charges into the compressed rotating air charge in two streams oppositely disposed and extending in directions diagonally across the terminal portions at each end of the length of the chamber and in the direction of air rotation.

21. In an internal combustion engine of the compression ignition type, the combination with an elongated combustion chamber into which an air charge is compressed, means for establishing rotation of the air charge about a short axis of the chamber, and means for injecting atomized liquid fuel charges into the compressed rotating air charge in two parallel jets on opposite sides of the rotational axis and in the direction of air rotation.

JESSE G. VINCENT.